Patented June 2, 1936

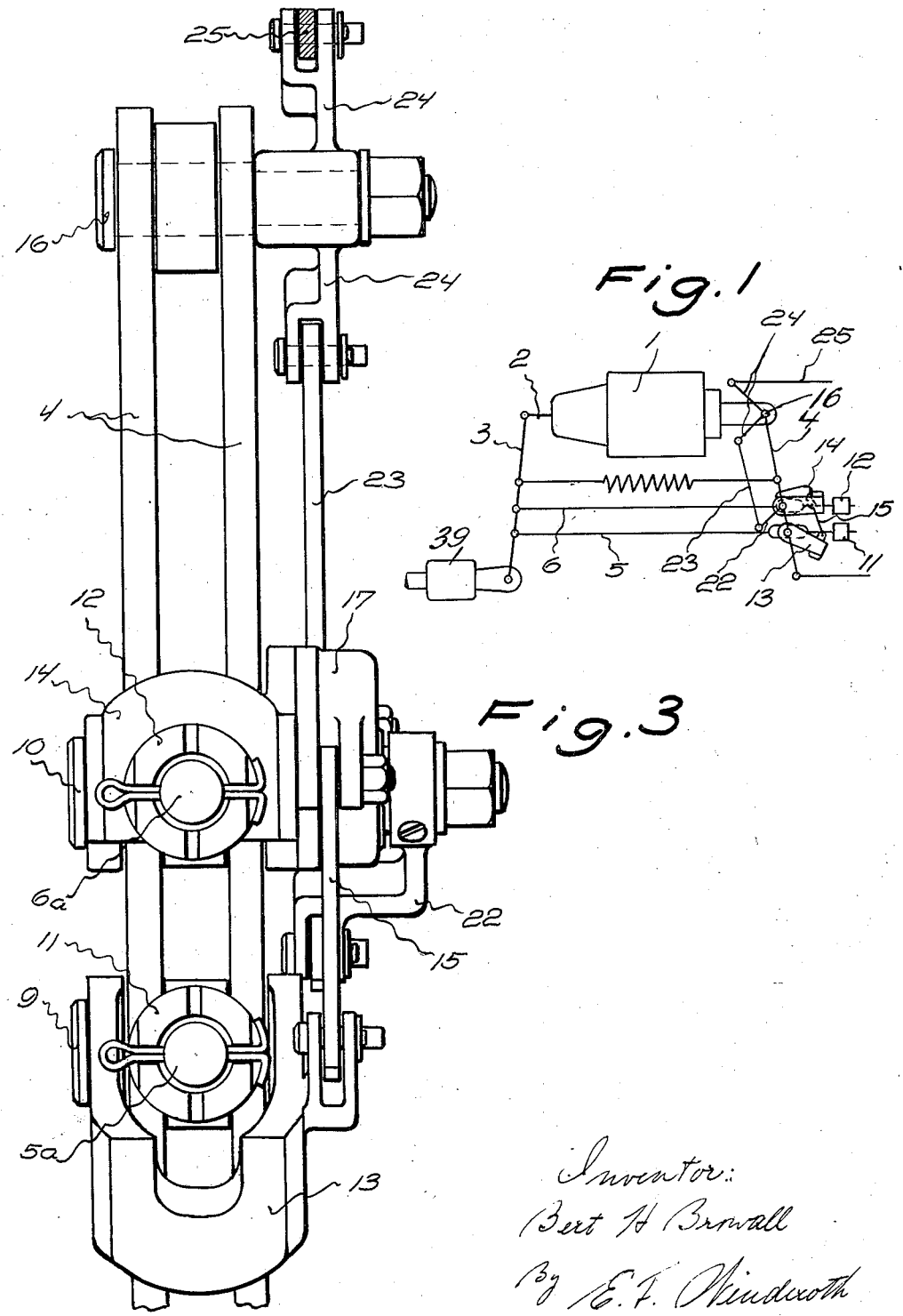

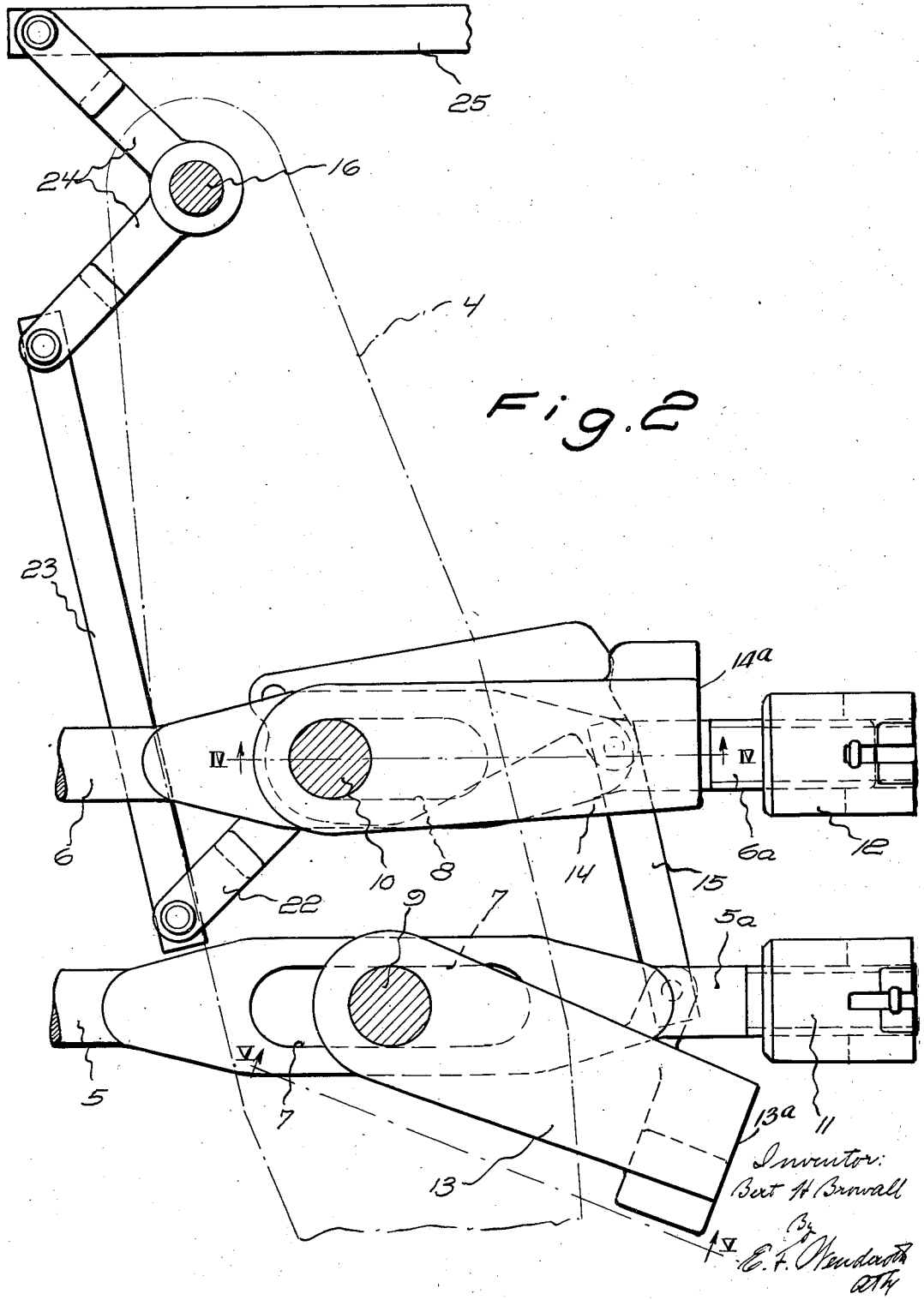

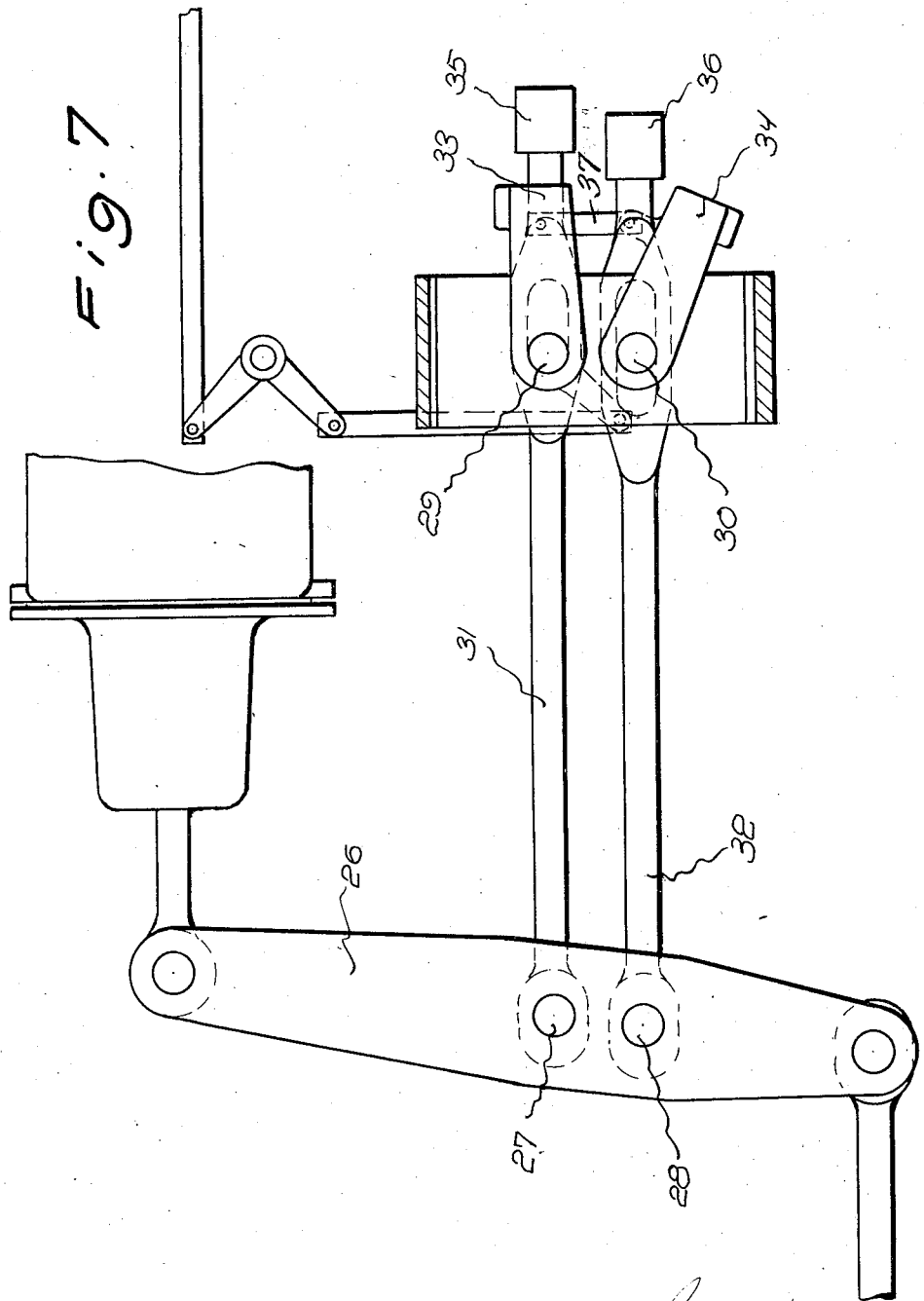

2,042,649

UNITED STATES PATENT OFFICE 2,042,649

VARIABLE LEVERAGE MECHANISM FOR VEHICLE BRAKES

Bert Henry Browall, Malmo, Sweden, assignor to Svenska Aktiebolaget Bromsregulator, Malmo, Sweden, a corporation of Sweden Application April 2, 1935, Serial No. 14,335. Renewed April 3, 1936. In Germany January 7, 1935

4 Claims. (Cl. 188—195)

This invention relates to vehicle brakes, especially railway car brakes, of the variable leverage type, in which for the purpose of selectively producing different leverage ratios in the brake rigging which connects the brake shoes to the brake piston or other source of braking power, one or each of a number of the brake levers of the brake rigging is provided with two or more fulcrums which divide the lever into different leverage ratios and are rendered operative selectively by means of abutments which are movable in and out of active position and so connected with each other than when the abutment for one of the fulcrums is moved in active position, the abutment or abutments for the other fulcrum or fulcrums is or are moved in inactive position.

The object of the invention is to provide a variable leverage mechanism of this type, which is simple in construction and efficient in operation and which easily can be suited to all types of brake riggings without any material change of the construction of the mechanism, or of the standard shape and size of its essential parts. Especially the invention has for its object to facilitate mounting of the variable leverage mechanism in existing brake riggings independently of differences between them, such as differences concerning the distance between the different fulcrums, which differences are due to differently selected leverage ratios on different cars.

With the above and other objects in view the principal features of the invention consist in that the movable abutments for selectively rendering the different fulcrums of the lever or levers operative all are constructed as swingable pawls pivoted each on its own of said fulcrums and coact with abutments on rods which are linked each to its own of said fulcrums and which in a manner known per se are provided each with a clearance or idle motion in relation to its fulcrum, which idle motion is reduced by the pawl when the latter is in active position, the pawls on the different fulcrums being interconnected by means of a link rod or link rods in such a way that when one of the pawls is swung in active position the other pawl or pawls is or are swung in inactive position.

In the following the invention will be explained with reference to the accompanying drawings illustrating two practical embodiments thereof to enable others to adopt and use the same, and in the appended claims the novel features of construction and combination of parts for which protection is desired will be summarized.

In said drawings:—

Fig. 1 is a diagrammatic plan view of a brake cylinder with associated brake levers and variable leverage mechanism according to the first embodiment of the invention.

Fig. 2 is a plan view on a larger scale of the dead brake lever and the variable leverage mechanism associated therewith, certain parts being shown in section.

Fig. 3 is a side view of the parts shown in Fig. 2.

Fig. 7 is a plan view illustrating the second embodiment of the invention.

Figure 4:
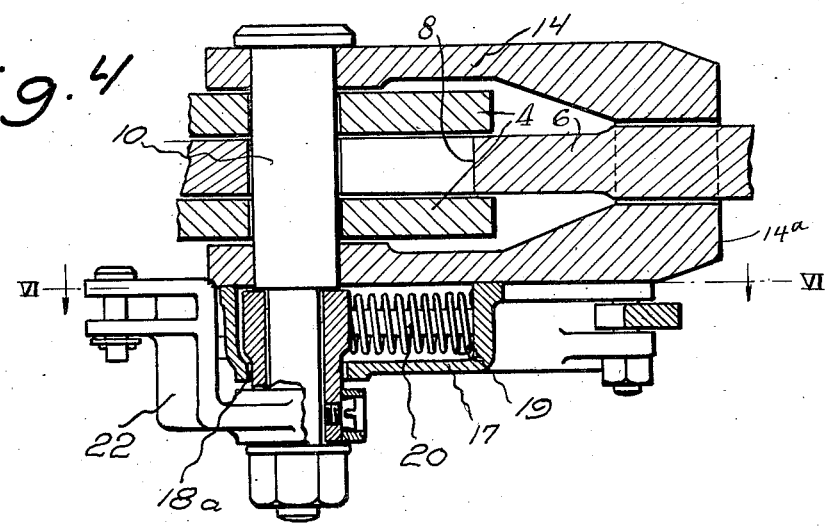
Fig. 4 is a vertical section on the line IV—IV in Fig. 2 of one of the swingable pawls.
Figure 5:
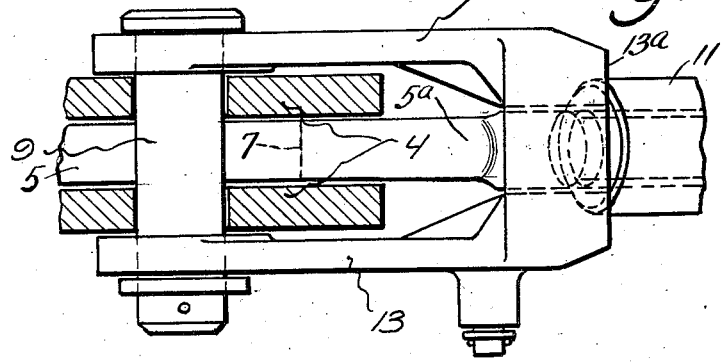
Fig. 5 is a section substantially on the line V—V in Fig. 2 and shows the other swingable pawl.

Referring first to Fig. 1, the reference character 1 indicates the brake cylinder and 2 the piston rod of the brake piston working in said cylinder, while 3 and 4 denote the live and floating brake levers linked to the piston rod 2 and to a fixed pivot 16, respectively. The two brake levers 3 and 4 are interconnected by means of two connection rods 5 and 6 linked to the same in different points dividing each of the levers in two different leverage ratios. The connection rod 5 determines the higher leverage ratio suited to loaded car, and the connection rod 6 determines the lower leverage ratio suited to empty car. Each of the connection rods has a certain idle motion or play which, as shown in Fig. 2, is provided for at the place where the rod is linked to the floating brake lever 4, each of the rods having an elongated slot 7 and 8, respectively, for the fulcrum bolts 9 and 10, respectively, through which the conection rods 5 and 6 are connected to the floating brake lever 4. The connection rods 5 and 6 are extended beyond the slots 7 and 8, respectively, and on each of the extensions 5a and 6a there is provided an adjustable abutment in the form of an adjustable nut, designated 11 and 12 respectively, which is screwed on the screw threaded extension. On the fulcrum bolts 9 and 10 there are journaled swingable pawls 13 and 14, respectively, which in active position abut the abutment nuts 11 and 12 on the extension 5a and 6a, respectively. Each of the pawls 13, 14 has the shape of a fork having two legs integral with a head 13a and 14a, respectively, at the free end of the pawl and pivoted at the other end of the pawl on the fulcrum bolt on opposite sides of the lever 4. The two pawls 13 and 14 are so arranged as to be swung out of active position in opposite directions. In Fig. 2 the pawl 13 is out of active position, and the pawl 14 is in active position. The two pawls 13 and 14 are so connected with each other by means of a link rod 15 that when one of the pawls is swung in active position the other pawl is swung out of active position, and vice versa.

Figure 6:
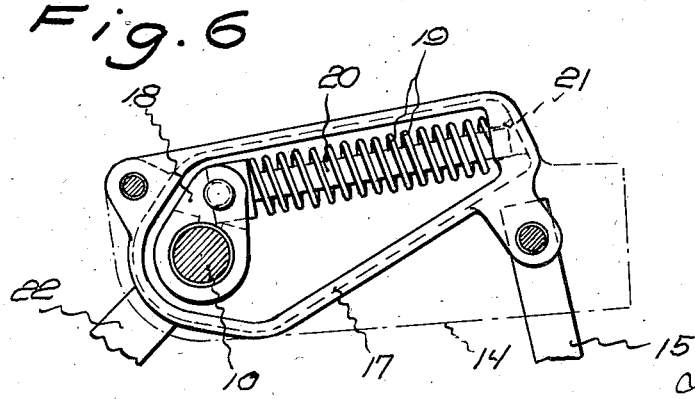
Fig. 6 is a section on line VI—VI in Fig. 4.

On the under side of one of the pawls, preferably the pawl 14 on the fulcrum bolt 10 nearest to the fixed pivot 16, there is secured a housing 17, and in this housing on the bolt 10 there is pivoted an arm 18. Between this arm 18 and the remote end wall of the housing 17 there is inserted a compression spring 19 which is coiled around a spindle 20, one end of the spindle 20 being pivoted to the arm 18, while the other end of the spindle is guided in a recess 21 in the aforesaid end wall of the housing 17. The hub 18a of the arm 18 projects through an opening in the housing and is provided on its projecting end with an arm 22 which is connected, for instance by means of a link rod 23, to one arm of a bell crank lever 24 pivoted on the fixed pivot 16. The other arm of said bell crank lever 24 is adapted to be connected, for instance by means of a link rod 25, to a setting shaft (not shown) through the setting of which the arm 22 and thereby also the arm 18 can be rotated through an angle of approximately 90 degrees. When the arm 18 is moved to one of its end positions, that is the end position shown in Fig. 6, the spring 19 tends to move and retain the pawl 14 in active position. When the arm 18 is turned over to the other of its end positions the spring 19 tends to move and retain the pawl 14 in inactive position. The arrangement of the spring 19 is known per se and serves the purpose of permitting resetting of the setting shaft hereinbefore mentioned also when the brakes are applied. When resetting the setting shaft under such conditions the spring 19 yields, and then the spring moves the pawl to the new position corresponding to the reset position of the setting shaft as soon as the pawl becomes free to move at the release of the brake.

Figs. 1 and 2 show the mechanism in released position of the brakes. In this position the fulcrum bolt 10 is in the inner end of the slot 8 in the connection rod 6 which is operative when braking on the lower leverage ratio, while the fulcrum bolt 9 is substantially at the middle point of the slot 7 in the connection rod 5 which is operative when braking on the higher leverage ratio. In the released position of the brakes there should be a certain play between the pawl 14, when the latter is in active position, and the abutment nut 12, whereas there should be only such a clearance between the pawl 13, when the latter is in active position, and the abutment nut 11 that in the released position of the brakes the pawl 13 can be swung in and out of active position. The play between the pawl 14 and the nut 12 serves the purpose of equalizing the brake piston strokes when braking on the different leverage ratios, and preferably the said play is determined in the following way: the slack between the brake shoes and the wheels is adjusted so that the desired brake piston stroke when braking on the higher leverage ratio is obtained, and then the pawls are reset so that the pawl 14 takes the active position, whereupon some braking operations are performed by way of trial for determining the position of the abutment nut 12, at which the same brake piston stroke as when braking on the higher leverage ratio is attained. This brake piston stroke can then be kept constant by the use of an automatic slack adjuster 39 (Fig. 1) for compensating the wear of the brake shoes.

The variable leverage mechanism can be attached in different ways to brake riggings of different types. According to the embodiment illustrated in Fig. 7 the fulcrum bolts 27 and 28 on the brake lever 26, which determine the different leverage ratios, are connected to fixed supporting bolts 29 and 30, respectively, which are mounted in the frame of the car, by means of rods 31 and 32, respectively. The swingable pawls 33 and 34 which coact with the adjustable abutments 35 and 36 on the rods 31 and 32, respectively, and are connected with each other by means of a single link rod 37, may be pivoted either on the supporting bolts 29 and 30, respectively, as shown in Fig. 7, or on the fulcrum bolts 27 and 28, respectively. In every case the rods 31 and 32 have a play in relation to the bolts on which the swingable pawls are pivoted. The setting means for the pawls may be of the same character as indicated with reference to the embodiment of the invention illustrated in Figs. 1–6.

What I claim and desire to secure by Letters Patent is:—

1. In a variable leverage mechanism for vehicle brakes, of the character described, a brake lever having spaced fulcrums disposed at fixed points dividing the lever in different leverage ratios, rods to which said brake lever is fulcrumed at said fixed fulcrum points, and means for selectively rendering said rods operative at braking, said means including means for producing an idle motion between each of said rods and said lever, an abutment on each of said rods, a pawl pivoted to said lever at each of said fixed fulcrum points and swingable in and out of active position for coaction with the abutment on the adjacent rod for reducing the idle motion between the rod and the lever, and means connecting said pawls with each other in such a way that when one pawl is swung in active position the other is swung out of active position, and vice versa.

2. In a variable leverage mechanism for vehicle brakes, of the character described, a brake lever, a set of spaced fulcrum bolts on said lever, rods to which said lever is fulcrumed by means of said fulcrum bolts, another set of bolts to which said rods are linked, said rods having elongated slots for the bolts of one of said sets for producing an idle motion between each of said rods and its bolt of this set, an abutment on each of said rods, a pawl pivoted on each of the bolts of the last mentioned set and swingable in and out of active position for coaction with the abutment on the adjacent rod for reducing the idle motion between the rod and the bolt, and means connecting said pawls with each other in such a way that when one pawl is swung in active position the other is swung out of active position, and vice versa.

3. In a variable leverage mechanism for vehicle brakes, of the character described, a brake lever, a set of spaced fulcrum bolts on said lever, rods to which said lever is fulcrumed by means of said bolts, another set of bolts to which said rods are linked, said rods having elongated slots for the bolts of one of said sets for producing an idle motion between each of said rods and its bolt of this set, an adjustable abutment on each of said rods, a pawl pivoted on each of the bolts of the last mentioned set and swingable in and out of active position for coaction with the abutment on the adjacent rod for reducing the idle motion between the rod and the bolt, said pawls being so arranged that one pawl is swung in active position in the same direction as the other is swung out of active position, and a link rod so connecting said pawls with each other that when one of the pawls is swung in active position the other is swung out of active position, and vice versa.

4. In a variable leverage mechanism for vehicle brakes, of the character described, a brake lever, a set of spaced fulcrum bolts on said lever, rods to which said lever is fulcrumed by means of said bolts, another set of bolts to which said rods are linked, said rods having elongated slots for the bolts of one of said sets for producing an idle motion between each of said rods and its bolt of this set, an abutment on each of said rods, a pawl pivoted on each of the bolts of the last mentioned set and swingable in and out of active position for coaction with the abutment on the adjacent rod for reducing the idle motion between the rod and the bolt, said pawls being so interconnected and arranged that when one of the pawls is swung in active position the other is swung in the same direction out of active position, and vice versa, an arm pivoted on one of the bolts on which the said pawls are pivoted, and adapted to be set in any one of two predetermined angular end positions, and a spring device so connecting the pawl pivoted on the same bolt as the said arm with the latter that the spring device tends to swing and retain the pawl in active position when the said arm is set in one of its end positions and to swing and retain the pawl in inactive position when the said arm is set in the other of its end positions.

BERT HENRY BROWALL.